Figure 1:
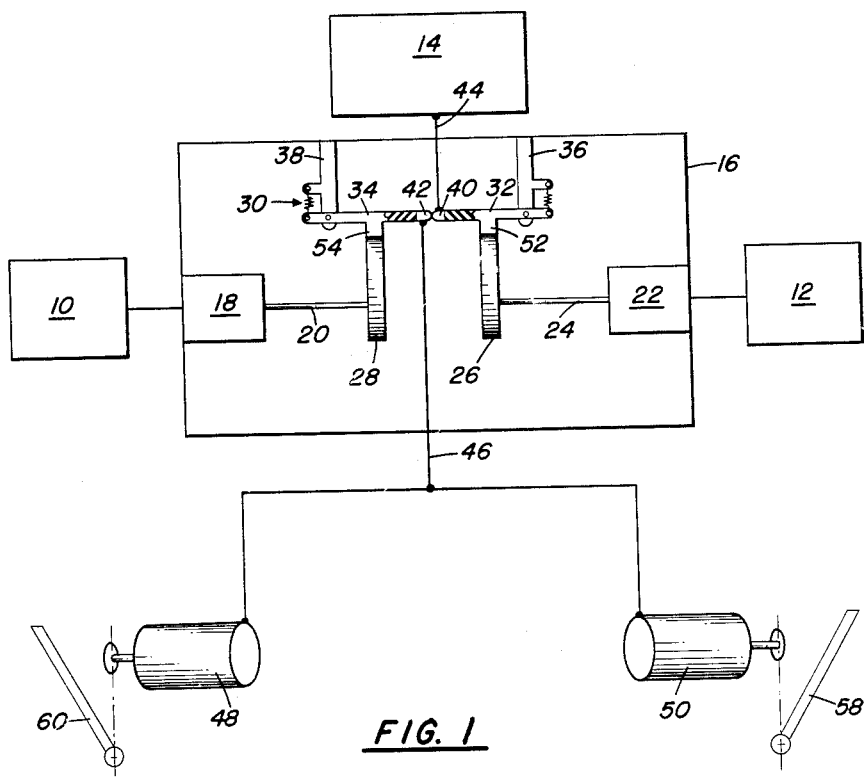

May 1, 1956 R. GROSSE-LOHMANN 2,744,173
AUTOMATIC CRITICAL AERODYNAMIC LIMIT ACTUATOR
Filed Dec. 18, 1952

Inventor
RALPH GROSSE-LOHMANN

By
Walter S. Paul
Attorneys

United States Patent Office 2,744,173
Patented May 1, 1956

2,744,173

AUTOMATIC CRITICAL AERODYNAMIC LIMIT ACTUATOR

Ralph Grosse-Lohmann, Montgomery County, Md.

Application December 18, 1952, Serial No. 326,804

7 Claims. (Cl. 200—52)

(Granted under Title 35, U. S. Code (1952), sec. 266)

The invention described herein may be manufactured and used by or for the Government of the United States of America for governmental purposes without the payment of any royalties thereon or therefor.

This invention relates to improvements in aircraft safety devices and particularly to means for applying corrective action to an aircraft control when the aircraft closely approaches its critical aerodynamic limit.

Aerodynamic limits are discussed generally in my copending application Serial No. 326,805, filed on December 18, 1952, for Critical aerodynamic limit indicator. Such limits are of great importance since the structure of the aircraft is not designed to exceed those limits. Critical angle of attack plotted against Mach number will provide a curve, graphically representing the critical aerodynamic limits for a particular aircraft, and the safe flight range is contained within or bounded by that curve. It is an object of this invention to provide means for operating a control, control surface or warning signal, device at such time that the aircraft closely approaches the critical aerodynamic limit in order to ensure safety of flight regardless of loading, altitude, attitude and all of the other factors which Mach number and angle of attack take into consideration.

A more specific object of the invention is to provide an apparatus for preventing an aircraft from exceeding its critical aerodynamic limits, which includes a Mach meter and an angle of attack meter, each producing an electrical signal which is used to actuate movable parts of a switch, the switch controlling the energization of a motor that actuates a control surface, such as the elevator or air brakes, or gives a signal such as operating a light or bell. Critical aerodynamic limits are not the same for each Mach number and therefore, the point at which the switch is closed must be a function of the instantaneous Mach number and angle of attack. To provide such a variable, the disclosed embodiment resorts to mechanical means, although a purely or partial electronic system may be used.

A further object of the invention is to teach a method of preventing critical aerodynamic limit from being exceeded, which includes the technique of providing electrical signals which vary in accordance with angle of attack and Mach number values, integrating the signals and discriminating between the integrated signals which are representative of flight beyond the safe performance range and those which are within said range, and applying corrective motion to a control in response to integrated signals which reflect an unsafe flight condition.

Figure 2:
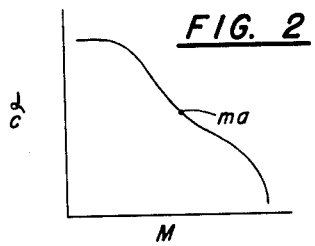

Ancillary objects and features of importance will become apparent in following the description of the drawing. In the drawing:

Fig. 1 is a schematic diagram of wiring and mechanical elements arranged to form the invention; and Fig. 2 is a graph showing a typical critical aerodynamic limit curve.

In Fig. 1 there are schematically shown, an angle of attack transmitter 10 capable of delivering an electrical signal or signal output proportional to the angle of attack of the aircraft and a Mach meter 12 for providing an electrical signal proportional to the Mach number at which the aircraft is flying. A source 14 of electrical energy is connected with the critical angle of attack computer 16, the structure of which is shown in some detail.

Computer 16 includes a first servo motor 18 energized by the transmitter 10, and capable of following the transmitter signal. It converts the electrical signal from transmitter 10 to rotary mechanical motion at shaft 20 of the motor. A second motor 22, similar to the motor 18 but connected for operation by the signal output of transmitter 12, has a shaft 24 to which cam 26 is fastened. A cam 28 is secured to the shaft 20 of motor 18, and these cams rotate in response to angle of attack and Mach number values. A switch 30 has switch arms 32 and 34 mounted for pivotal movement on supports 36 and 38, the contact 40 of arm 32 being connected with a wire 44 from the power supply 14, and the contact 42 of arm 34 being connected with a wire 46 which feeds servo motors 48 and 50. The contacts 40 and 42 are insulated from the remainder of the arms by suitable insulation, and the contacts are adapted to touch each other whenever the aircraft closely approaches its critical aerodynamic limit, thus closing the circuit including the wires 44 and 46 together with a source 14 and servo motors 48 and 50.

The shapes of cams 26 and 28 play a major part in determining the operativeness of the apparatus, since the cam followers 52 and 54 on arms 32 and 34 are spring biased against the cams 26 and 28, and it is only when the contacts of arms 32 and 34 are touching that the servo motors 48 and 50 become energized. Reference is made to Fig. 2 to show the significance of the shape of each cam. A point on cam 26 represents an arbitrarily selected point $m$ and any other point along a vertical line drawn through point $m$. One point on cam 28 will coincide with point $m$, at $a$, making the point $ma$ which falls directly on the critical aerodynamic limit curve. This will provide one point on each cam in the operation thereof where the contacts 40 and 42 must touch to close the circuit having motors 48 and 50. Any number of such points may be taken from the graph of Fig. 2 in order to generate these cams. When the cams 26 and 28 attain any relation with respect to each other so that the integrated point lies on the graph of Fig. 2, the contacts 40 and 42 touch each other to permit the servomotors 48 and 50 to be energized. However, by reducing one of the variables, that is angle of attack or Mach number, the proper cam will be rotated moving the arm which rests upon it and causing the contacts 40 and 42 to be separated. The graphical effect of this is to shift the point on the graph—say $ma$—below the critical aerodynamic limit curve, and the result is that the circuit having motors 48 and 50 in it, is opened.

The critical aerodynamic limit curve may be calculated, but it is common to fly the aircraft at a known Mach number and increase the angle of attack until buffeting occurs. This provides one point on the graph. The aircraft is flown at another Mach number and the angle of attack increased until buffeting occurs, thereby providing a second point. This procedure is repeated until the entire critical aerodynamic curve is obtained.

Although the servomotors 48 and 50 are shown as being schematically connected to air brakes 58 and 60, those motors could be connected to any other appropriate control surface of the aircraft. The motors 48 and 50 may even be omitted and the wire 46 used to energize an alarm of any known type which may be already present or installed in an aircraft.

Instruments suitable for angle of attack transmitter 10 and Mach meter 12, i. e. instruments capable of producing signals that can be converted into shaft rotations, are well known to those skilled in the art. A typical angle of attach transmitter is disclosed in the patent of A. Raspet No. 2,445,746 of July 20, 1948 and a suitable Mach meter is found in the patent of W. Angst No. 2,522,337 of September 12, 1950 or the subsonic machmeter type 815BX manufactured by Kollsman Instruments. Likewise there are many devices suitable for servomotors 18 and 22, i. e. for converting an electrical signal into a shaft rotation. For example, the control system in the patent of H. C. Roters No. 2,390,463 of December 4, 1945 or the follow-up system in the patent of D. S. Bond No. 2,208,623 of July 23, 1940 are representative systems.

Obviously many modifications and variations of the present invention are possible in the light of the above teachings. It is therefore to be understood that within the scope of the appended claims the invention may be practiced otherwise than as specifically described.

What is claimed is:

1. An actuator for producing an electrical signal when the critical aerodynamic limit of an aircraft is closely approached, comprising: an input terminal for connection to a source of electrical energy, an output terminal, a switch having two contacts one of which is connected to said input terminal and the other of which is connected to said output terminal, and means for moving said contacts in a manner such that they come into contact with each other only when the critical aerodynamic limit of the aircraft is closely approached.

2. An actuator for producing an electrical signal when the critical aerodynamic limit of an aircraft is closely approached, comprising: an input terminal for connection to a source of electrical energy, an output terminal, a switch having two relatively movable contacts which touch when passing each other, leads for connecting one of said contacts to said input terminal and the other of said contacts to said output terminal, first means for moving one of said contacts as a function of the abscissas of the points on the critical aerodynamic curve of the aircraft, and second means for moving the other of said contacts as a function of the ordinates of the points on the critical aerodynamic curve of the aircraft.

3. The actuator of claim 2 wherein said first means comprises a first cam having a surface the shape of which is a function of the abscissas of the points on the critical aerodynamic curve and Mach meter means for producing a rotational movement of said first cam that is a function of Mach number, and wherein said second means comprises a second cam having a surface the shape of which is a function of the ordinates of the points on the critical aerodynamic curve and angle of attack transmitter means for producing a rotational movement of said second cam that is a function of angle of attack.

4. An actuator for producing an electrical signal when an aircraft approaches its critical aerodynamic limit, said actuator comprising: an input terminal for connection to a source of electrical energy, an output terminal, a switch having a first switch arm and a second switch arm, means for mounting said first and second switch arms for pivotal movement above axes such that said switch arms can contact each other, leads connecting said first switch arm to said input terminal and said second switch arm to said output terminal, and switch operating means responsive to instantaneous Mach number and angle of attack of the aircraft for moving said first and second switch arms into contact when the critical aerodynamic limit of the aircraft is closely approached.

5. The actuator of claim 4 wherein said switch operating means comprises: a first shaft, Mach meter means for producing an angular rotation of said first shaft which is proportional to Mach number, a second shaft, angle of attack transmitter means for producing an angular rotation of said second shaft that is proportional to angle of attack, a first cam mounted on said first shaft and contacting said first switch arm, and a second cam mounted on said second shaft and contacting said second switch arm.

6. An actuator for producing an electrical signal when an aircraft approaches its critical aerodynamic limit, said actuator comprising: an input terminal for connection to a source of electrical energy, a switch having a first switch arm and a second switch arm, means for mounting said first and second switch arms for pivotal movement about axes such that said switch arms can make contact through a substantial arc of their pivotal movement, leads connecting said first switch arm to said input terminal and said second switch arm to said output terminal, and switch operating means responsive to instantaneous Mach number and angle of attack of the aircraft for moving said first and second switch arms into contact in the aforementioned substantial arc when the instantaneous Mach number and angle of attack closely approach a critical aerodynamic limit of the aircraft.

7. The actuator of claim 6 wherein said switch operating means comprises: a first shaft; Mach meter means for producing an angular rotation of said first shaft which is a function of the Mach number of the aircraft; a second shaft; angle of attack transmitter means for producing an angular rotation of said second shaft that is a function of angle of attack; a first cam mounted on said first shaft for moving said first switch arm through the aforementioned substantial arc and a second cam mounted on said second shaft for moving said second switch arm through the aforementioned substantial arc, the shapes of the surfaces of said first and second cams being such that said first and second switch arms come into contact only when the instantaneous Mach number and angle of attack closely approach a critical aerodynamic limit of the aircraft.

References Cited in the file of this patent

UNITED STATES PATENTS

| 1,818,963 | Tolson | Aug. 11, 1931 |
| 2,356,339 | Morrison | Aug. 22, 1944 |
| 2,463,585 | Young | Mar. 8, 1949 |
| 2,512,790 | Cleveland | Aug. 27, 1950 |
| 2,549,020 | Seldon | Apr. 17, 1951 |
| 2,553,983 | Saxman, Jr. | May 22, 1951 |

FOREIGN PATENTS

| 307,322 | Great Britain | Aug. 10, 1928 |